United States Patent
Kubina et al.

(10) Patent No.: US 8,712,651 B2
(45) Date of Patent: Apr. 29, 2014

(54) CONTROL STRATEGIES FOR A MULTI-MODE DRIVE SYSTEM

(75) Inventors: Joseph E. Kubina, Oxford, MI (US); Aaron E. Thompson, Grand Blanc, MI (US); Donald F. Schmanski, Howell, MI (US); Michael W. Gapski, Eastpointe, MI (US); Kenneth M. Pachucki, Lapeer, MI (US); Richard S. Silbert, Commerce Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 122 days.

(21) Appl. No.: 13/525,449

(22) Filed: Jun. 18, 2012

(65) Prior Publication Data

US 2013/0338887 A1    Dec. 19, 2013

(51) Int. Cl.
*G06F 7/00*    (2006.01)
*B60W 20/00*    (2006.01)
*B60W 30/18*    (2012.01)
*B62D 5/04*    (2006.01)

(52) U.S. Cl.
CPC .............. *B60W 20/30* (2013.01); *B60W 30/18* (2013.01); *B62D 5/046* (2013.01)
USPC ................................ 701/54; 701/51; 701/62

(58) Field of Classification Search
CPC ....... B60W 20/30; B60W 30/18; B62D 5/046
USPC ............................................... 701/51, 54, 62
See application file for complete search history.

(56) References Cited

U.S. PATENT DOCUMENTS

| | | | |
|---|---|---|---|
| 4,696,365 A | | 9/1987 | Ishimori et al. |
| 5,669,849 A | * | 9/1997 | Tabata et al. .................. 477/102 |
| 5,733,223 A | * | 3/1998 | Matsubara et al. ........... 477/175 |
| 5,904,632 A | | 5/1999 | Brown et al. |
| 6,102,831 A | * | 8/2000 | Wakahara et al. ............ 477/169 |
| 6,223,592 B1 | * | 5/2001 | Genise ....................... 73/115.02 |
| 7,532,968 B2 | * | 5/2009 | Kadota ........................... 701/55 |
| 8,095,287 B2 | | 1/2012 | Beechie |
| 2008/0182718 A1 | * | 7/2008 | Ido et al. ....................... 477/125 |
| 2009/0132133 A1 | * | 5/2009 | Kojima et al. .................. 701/52 |
| 2012/0158258 A1 | * | 6/2012 | Yasunaga et al. ............... 701/52 |
| 2013/0110360 A1 | * | 5/2013 | Saito et al. ...................... 701/51 |

FOREIGN PATENT DOCUMENTS

| | | |
|---|---|---|
| EP | 0688977 A2 | 12/1995 |
| EP | 1555461 A1 | 7/2005 |
| JP | 2000081129 A | 3/2000 |
| JP | 2000127789 A | 5/2000 |
| JP | 2008189110 A | 8/2008 |

OTHER PUBLICATIONS

Machine English language translation of Japan Publication No. 2000-127789, originally published in Japanese on May 9, 2000.*

(Continued)

*Primary Examiner* — Calvin Cheung
(74) *Attorney, Agent, or Firm* — Ralph E. Smith

(57) ABSTRACT

A method of operating a multi-mode drive system that precisely orchestrates a shift between gear ratios in a power take off unit and a rear drive module. The method first shifts between gear ratios in the power take off unit and then, depending upon the success or failure of the shift of the power take off unit, shifts between gear ratios in the rear drive module.

20 Claims, 4 Drawing Sheets

(56) References Cited

OTHER PUBLICATIONS

Machine English language translation of Japan Publication No. 2000-081129, originally published in Japanese on Mar. 21, 2000.*

Machine English language translation of Japan Publication No. 2008-189110, originally published in Japanese on Aug. 21, 2008.*
International Search Report and Written Opinion dated Aug. 26, 2013 for International Application No. PCT/US2013/045138, International Filing Date Jun. 11, 2013.

* cited by examiner

CONTROL STRATEGIES FOR A MULTI-MODE DRIVE SYSTEM

FIELD

The present disclosure relates to control strategies for a multi-mode drive system, more particularly, to a multi-mode drive system for transaxle applications.

BACKGROUND

Many vehicles currently feature front-wheel drive transmissions. Recently, all wheel or four wheel drive automobiles have grown in popularity. To accommodate this growth in popularity, many vehicles that would traditionally feature front wheel drive have been equipped with all wheel or four wheel drive. Typically, these are smaller vehicles than a traditional SUV or pickup truck. Many of these vehicles feature an engine transversely mounted to the vehicle. A typical all wheel or four wheel drive system in these vehicles may feature an engine, a transmission coupled to the engine, a power take off unit coupled to the transmission, and a rear drive module coupled by a drive shaft to the power take off unit. The power take off unit typically includes a differential and is coupled to the front wheels of the vehicle. The rear drive module also typically includes a differential and drives the rear wheels.

A typical power take off unit and rear drive module may also include plurality of gear ratios. For instance, the power take off unit and rear drive module may include a normal drive gear ratio for everyday driving, a low range ratio for off-road use, for example, and a neutral position for towing, for example. The power take off unit and rear drive module must be operated in the same gear ratio. Shifting between the gear ratios in the power take off unit and rear drive module must be performed precisely to ensure the longevity of the power take off unit and rear drive module. In addition, the timing of the shift in the power take off unit and rear drive module has an effect upon vehicle occupant comfort as a poorly timed shift may result in vehicle lurching.

While present methods may meet needs, further improvement in the art is desirable.

SUMMARY

In one form, the present disclosure provides a method of shifting a multi-mode drive unit including a transmission, a power take off unit having a first plurality of gear ratios and coupled to the transmission, and a rear drive module having a second plurality of gear ratios and coupled to the power take off unit. In response to a shift request, a shift is initiated in the power take off unit from operation in a first gear ratio of the first plurality of gear ratios to operation in a second gear ratio of the first plurality of gear ratios. The progress of the shift of the power take off unit is monitored. The shift request is rejected if the power take off unit is unable to successfully shift from operation in the first gear ratio of the first plurality of gear ratios to operation in the second gear ratio of the first plurality of gear ratios. The rear drive module is shifted from operation in a first gear ratio of the second plurality of gear ratios to operation in a second gear ratio of the second plurality of gear ratios if the shift of the power take off unit is successfully completed.

In another form, the present disclosure provides a method of operating a multi-mode drive unit including a transmission, a power take off unit having a first plurality of gear ratios and coupled to the transmission, and a rear drive module having a second plurality of gear ratios and coupled to the power take off unit. The first plurality of gear ratios have gear ratio ratios corresponding to the second plurality of gear ratios. In the method a shift request is received. It is determined whether at least one interlock condition is satisfied. The shift request is rejected if the at least one interlock condition is not satisfied. A shift in the power take off unit is initiated from operation in a first gear ratio of the first plurality of gear ratios to operation in a second gear ratio of the first plurality of gear ratios if the at least one interlock condition is satisfied. Progress of the shift of the power take off unit is monitored. The shift request is rejected if the power take off unit is unable to successfully shift from operation in the first gear ratio of the first plurality of gear ratios to operation in the second gear ratio of the first plurality of gear ratios. The rear drive module is shifted from operation in a first gear ratio of the second plurality of gear ratios corresponding to the first gear ratio of the first plurality of gear ratios to operation in a second gear ratio of the second plurality of gear ratios corresponding to the second gear ratio of the first plurality of gear ratios if the shift of the power take off unit is successfully completed.

Thus, a control strategy for a multi-mode drive system having improved longevity and increased passenger/driver comfort is provided. The control strategy monitors and precisely times the shifts of the power take off unit and rear drive module.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
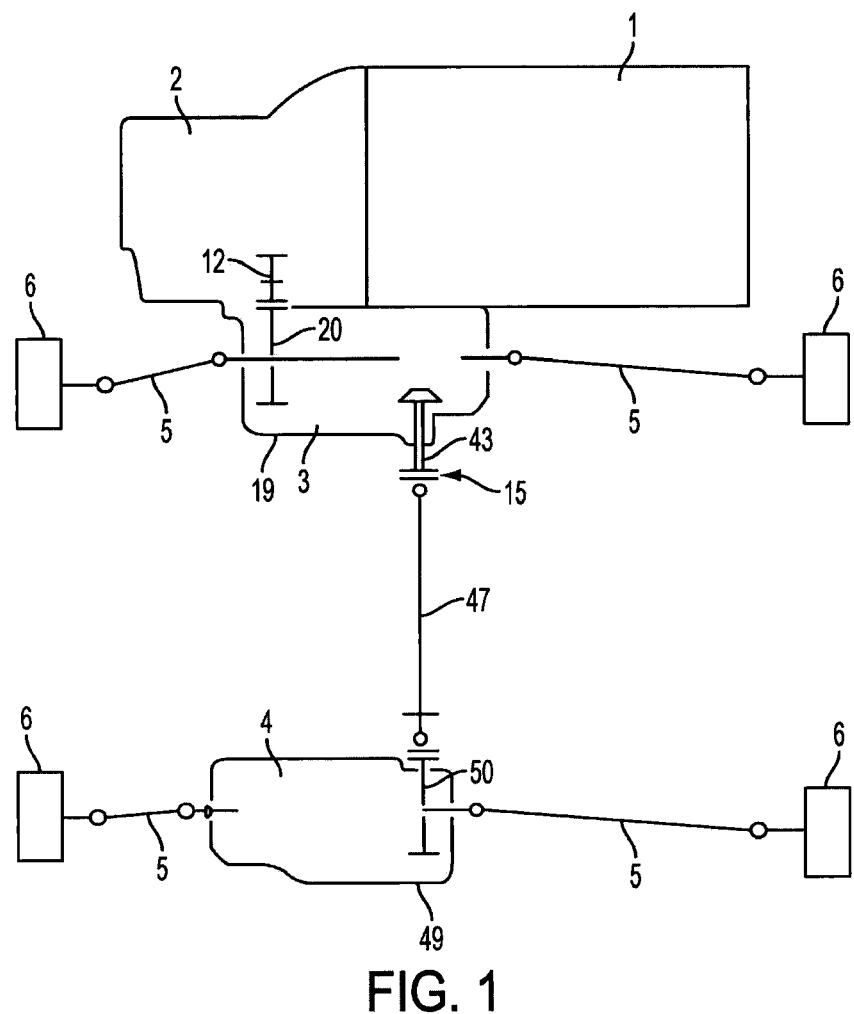
FIG. 1 is a schematic representation of an exemplary multi-mode drive system.

FIG. 1 illustrates an example schematic representation of an exemplary multi-mode drive system. The drive system includes an engine 1 coupled to a transmission 2. The engine 1 may be any type of power source including, but not limited to, an internal combustion engine, electric motor, or hydraulic motor. The transmission 2 may be any type of device capable of providing a plurality of gear ratios including, but not limited to, a manual transmission, automatic transmission, dual clutch transmission, or continuously variable transmission. The transmission 2 is coupled by a transmission output gear 12 to a power take off unit ("PTU") 3 enclosed by a PTU housing 19. The transmission 2 transmits a torque from the engine 1 to the PTU 3. The PTU 3 will be described in detail below with reference to FIG. 2. A PTU input gear 20 is coupled to the transmission output gear 12. The PTU 3 transmits torque from the transmission 2 to a pair of axles 5 coupled to front wheels 6 of the vehicle. The PTU 3 also transmits torque from the transmission 2 to a PTU output shaft 43. The PTU output shaft 43 is selectively coupled by a clutch mechanism 15 to a drive shaft 47. The drive shaft 47 is coupled to an RDM input gear 50 of a rear drive module ("RDM") 4. The RDM 4 is enclosed by an RDM housing 49 and transmits torque from the RDM input gear 50 to a second pair of axles 5 coupled to rear wheels 6 of the vehicle. In one embodiment, the clutch 15 is located within the RDM 4.

The PTU 3 and RDM 4 each provide for a plurality of modes of operation. In a first mode of operation, the PTU 3 and RDM 4 may be configured to cause the axles 5 to rotate at the same rotations per minute ("RPM") as the PTU input gear 20 ("normal mode of operation"). It is anticipated that the PTU 3 and RDM 4 will be configured in the normal mode of operation during the majority of use of the vehicle. In a second mode of operation, the PTU 3 and RDM 4 may be configured to cause the axles 5 to rotate at RPM less than the PTU input gear 20 ("low range mode of operation"). It is anticipated that the PTU 3 and RDM 4 will be configured in the low range mode of operation for off-road use or slow speed towing of another object. In a third mode of operation, the PTU 3 and RDM 4 may be configured to cause the axles 5 to rotate independently of the PTU input gear 20 ("neutral mode of operation"). It is anticipated that the PTU 3 and RDM 4 will be configured in the neutral mode of operation while the vehicle is being towed by another vehicle.

Figure 2:
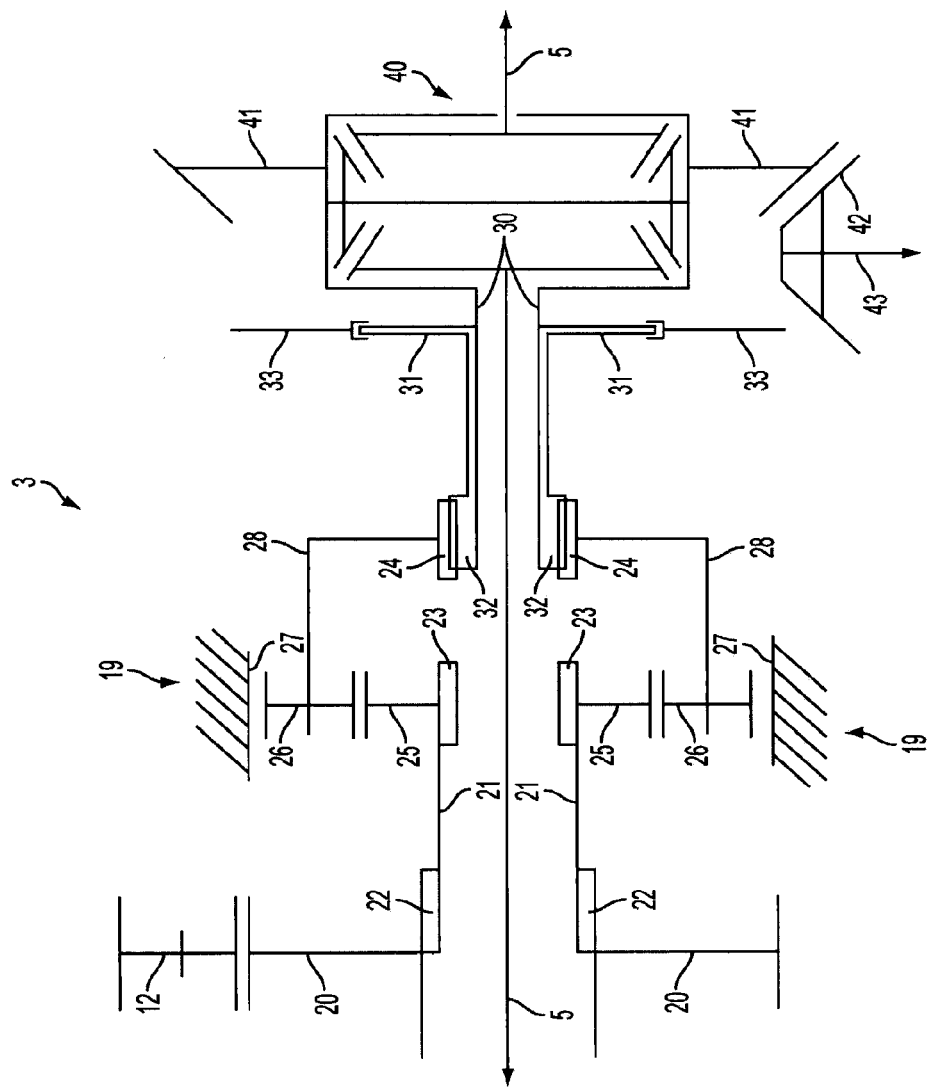
FIG. 2 is a schematic representation of an exemplary power take off unit of the multi-mode drive system of FIG. 1.

FIG. 2 is an example schematic representation of an exemplary PTU 3 of the multi-mode drive system of FIG. 1. The PTU 3 includes the PTU input gear 20 coupled to the transmission output gear 12. The PTU input gear 20 is non-rotatably coupled to a PTU input shaft 21 by PTU splines 22. The PTU input shaft 21 is non-rotatably coupled to a PTU sun gear 25. The PTU sun gear 25 is continuously meshed with PTU pinion gears 26 rotatably mounted upon a PTU carrier 28. The PTU pinion gears 26 are continuously meshed with a PTU ring gear 27. The PTU ring gear 27 is non-rotatably coupled to the PTU housing 19.

The PTU sun gear 25 is also non-rotatably coupled to PTU splines 23. The PTU carrier 28 is non-rotatably coupled to PTU splines 24. The PTU splines 23, 24 are selectively meshed with a PTU selector sleeve spline set 32 coupled to a PTU selector sleeve 31. The PTU selector sleeve 31 is slidable along the rotational axis of a PTU main shaft 30. A PTU shift fork 33 slides the PTU selector sleeve 31 and, correspondingly, the PTU selector sleeve spline set 32 along the rotational axis of the PTU main shaft 30. The PTU shift fork 33 may selectively position the PTU main shaft 30 in a plurality of positions to achieve a plurality of modes of operation. To achieve the normal mode of operation, the PTU shift fork 33 positions the PTU selector sleeve 31 such that the PTU selector sleeve spline set 32 is meshed with the PTU spline set 23, thereby, locking the PTU input shaft 21, PTU selector sleeve 31, and PTU main shaft 30 in synchronous rotation. To achieve the low range mode of operation, the PTU shift fork 33 positions the PTU selector sleeve 31 such that the PTU selector sleeve spline set 32 is meshed with the PTU spline set 24, thereby, locking the PTU carrier 28, PTU selector sleeve 31, and PTU main shaft 30 in synchronous rotation. To achieve the neutral mode of operation, the PTU shift fork 33 positions the PTU selector sleeve 31 such that the PTU selector sleeve spline set 32 is in the area between the PTU spline set 23 and the PTU spline set 24. Thus, the PTU selector sleeve spline set 32 is not meshed with either of the PTU spline set 23 or the PTU spline set 24. The PTU input shaft 21 is free to rotate independently of the PTU selector sleeve 31 and PTU main shaft 30.

The PTU 3 also includes a PTU differential 40. The PTU differential 40 is coupled to the axles 5. The PTU differential 40 may be any type of differential that permits a variation in the rotational speeds of the axles 5 to which it is attached. In one embodiment, the PTU differential 40 may be omitted entirely and the axles 5 may be locked together. The PTU differential 40 is also coupled to a PTU ring gear 41. The PTU ring gear 41 is continuously meshed with a PTU pinion gear 42 coupled to the PTU output shaft 43.

Figure 3:
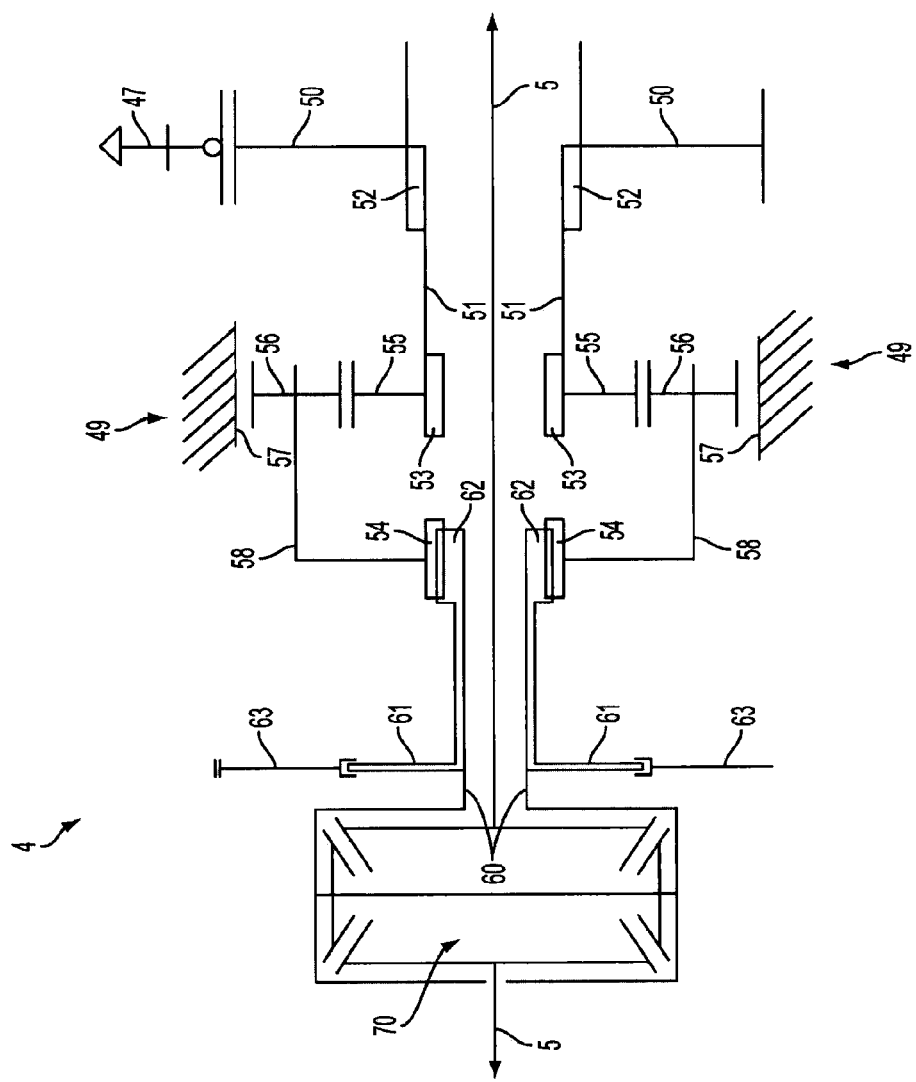
FIG. 3 is a schematic representation of a rear drive module of the multi-mode drive system of FIG. 1.

FIG. 3 is a schematic representation of an RDM 4 of the multi-mode drive system of FIG. 1. The RDM 4 includes the RDM input gear 50 coupled to the drive shaft 47. The RDM input gear 50 is non-rotatably coupled to an RDM input shaft 51 by RDM splines 52. The RDM input shaft 51 is non-rotatably coupled to an RDM sun gear 55. The RDM sun gear 55 is continuously meshed with RDM pinion gears 56 rotatably mounted upon an RDM carrier 58. The RDM pinion gears 56 are continuously meshed with an RDM ring gear 57. The RDM ring gear 57 is non-rotatably coupled to the RDM housing 49.

The RDM sun gear 55 is also non-rotatably coupled to RDM splines 53. The RDM carrier 58 is non-rotatably coupled to RDM splines 54. The RDM splines 53, 54 are selectively meshed with an RDM selector sleeve spline set 62 coupled to an RDM selector sleeve 61. The RDM selector sleeve 61 is slidable along the rotational axis of an RDM main shaft 60. An RDM shift fork 63 slides the RDM selector sleeve 61 and, correspondingly, the RDM selector sleeve spline set 62 along the rotational axis of the RDM main shaft 60. The RDM shift fork 63 may selectively position the RDM main shaft 60 in a plurality of positions to achieve a plurality of modes of operation. To achieve the normal mode of operation, the RDM shift fork 63 positions the RDM selector sleeve 61 such that the RDM selector sleeve spline set 62 is meshed with the RDM spline set 53, thereby, locking the RDM input shaft 51, RDM selector sleeve 61, and RDM main shaft 60 in synchronous rotation. To achieve the low range mode of operation, the RDM shift fork 63 positions the RDM selector sleeve 61 such that the RDM selector sleeve spline set 62 is meshed with the RDM spline set 54, thereby, locking the RDM carrier 58, RDM selector sleeve 61, and RDM main shaft 60 in synchronous rotation. To achieve the neutral mode of operation, the RDM shift fork 63 positions the RDM selector sleeve 61 such that the RDM selector sleeve spline set 62 is in the area between the RDM spline set 53 and the RDM spline set 54. Thus, the RDM selector sleeve spline set 62 is not meshed with either of the RDM spline set 53 or the RDM spline set 54. The RDM input shaft 51 is free to rotate independently of the RDM selector sleeve 61 and RDM main shaft 60.

The RDM 4 also includes an RDM differential 70. The RDM differential 70 is coupled to axles 5. The RDM differential 70 may be any type of differential that permits a variation in the rotational speeds of the axles 5 to which it is attached. In one embodiment, the RDM differential 70 may be omitted entirely and the axles 5 may be locked together.

Figure 4:
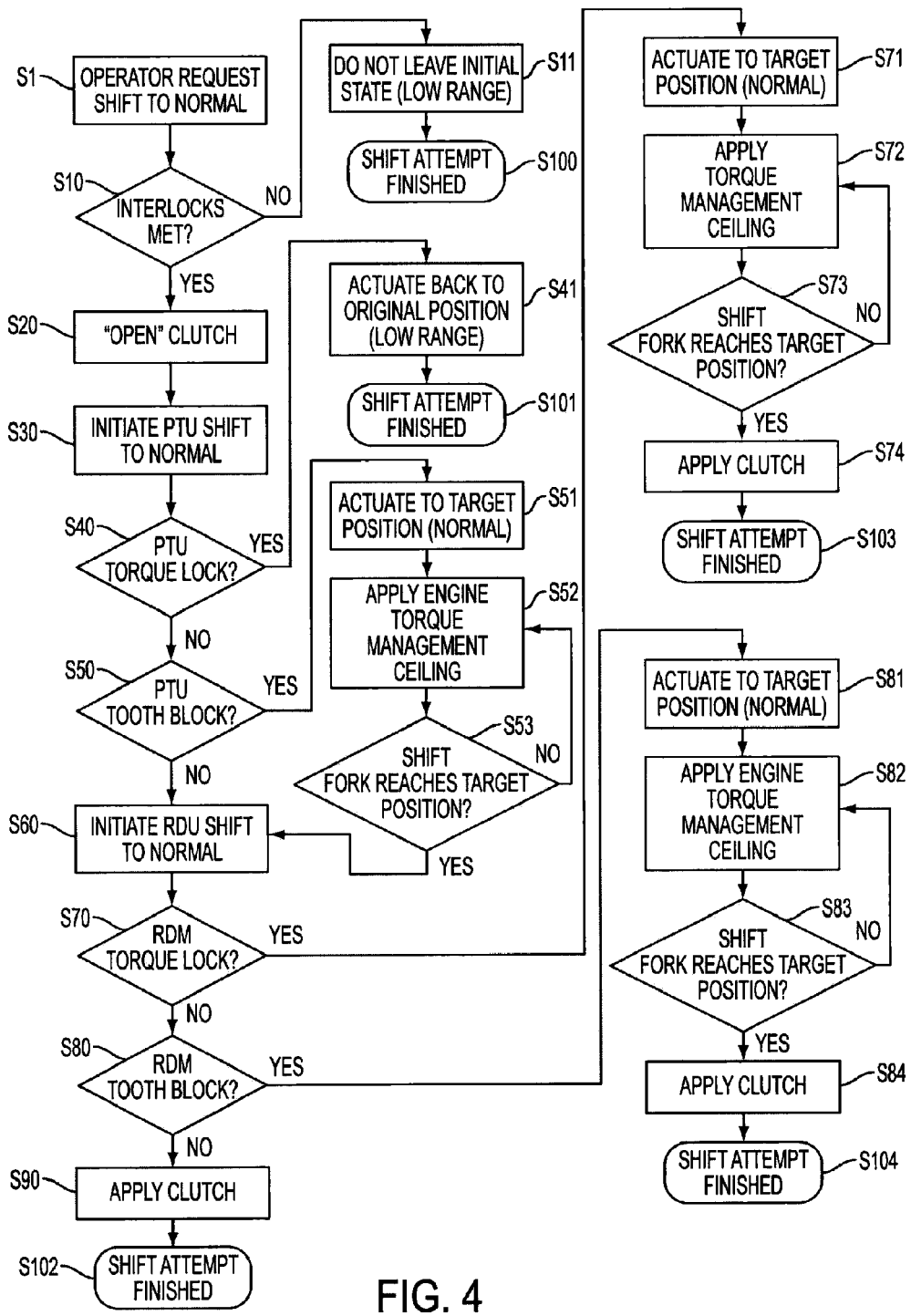
FIG. 4 is a flow chart showing an exemplary method of operating the multi-mode drive system of FIG. 1 according to the principles of the present disclosure.

FIG. 4 is an example flow chart showing an exemplary method of operating the multi-mode drive system of FIGS. 1-3 according to the principles of the present disclosure. In the example of FIG. 4, a shift from a low range mode of operation to a normal mode of operation is depicted. A shift to from a low range mode of operation to a neutral mode of operation, from a normal mode of operation to a neutral mode of operation, from a neutral mode of operation to a low range mode of operation, and from a neutral mode of operation to a normal mode of operation may all be completed using a similar process except that the RDM 3 and PTU 4 are shifted from the current mode of operation to the desired mode of operation (rather than from a low range mode of operation to a normal mode of operation). Embodiments of operation contemplated herein include a method for controlling the shift between gear ratios of the power take off unit and rear drive module that in a predetermined desirable manner precisely times the shift to improve longevity of the power take off unit and rear drive module and to increase passenger/driver comfort. In another desirable mode of operation, a method for monitoring the progress of the shift to ensure precise timing is contemplated.

To shift from a low range mode of operation to a normal mode of operation, a vehicle operator must first request the shift be made (S1). The method then checks a series of interlocks to determine whether the shift should be permitted (S10). In one embodiment, the are vehicle system and subsystem states that must be within an acceptable operating range in order to be satisfied. In one embodiment, where the operator wishes to shift the multi-mode drive system into a low range mode of operation or a normal mode of operation, the shift will only be permitted if all other shifts in the transmission 2 are already completed; there is no current anti-lock braking system ("ABS"), electronic stability program ("ESP"), or traction control system ("TSC") event; the vehicle ignition is on; the vehicle speed is less than a predetermined speed; the transmission 2 is in neutral; and the engine 1 is at idle RPM. In one embodiment, the predetermined speed is less than 5 meters/second. In one embodiment, where the operator wishes to shift the multi-mode drive system into a neutral mode of operation, the shift will only be permitted if all other shifts in the transmission 2 are already completed; there is no current ABS, ESP, or TSC event; the vehicle ignition is on; the vehicle is not moving; the transmission 2 is in neutral; the engine 1 is off; and the vehicle's brakes are engaged. In one embodiment, the interlocks could be any desired characteristics. The above-described interlocks are not limiting and not required for operation of the multi-mode drive system. In one embodiment, all of the interlocks must be satisfied before a shift will be permitted. In on embodiment, at least one of the interlocks must be satisfied before a shift will be permitted. In the event the interlocks are not satisfied, the multi-mode drive system will remain in its initial state (S11)—low range in the example of FIG. 4. The shift attempt is completed unsuccessfully (S100).

In the event the interlocks are satisfied (S11), the clutch 15 is disengaged or "opened" (S20). A shift is then initiated in the PTU 3 from the low range mode of operation to the normal mode of operation (S30). Control logic within the multi-mode drive system monitors the precise position of the PTU shift fork 33 during the shift process. The control logic monitors for a condition called PTU torque lock (S40). Torque lock is a condition in which residual torque within the PTU 3 cannot be overcome by an actuator that moves the PTU shift fork 33, thus, preventing the PTU shift fork 33 from completing the shift. In the event the control logic detects PTU torque lock, the PTU shift fork 33 is moved back to its original position (low range) (S41) and the shift attempt is completed unsuccessfully (S101). In one embodiment, in the event of PTU torque lock (S40), the control logic reattempts the shift in the PTU 3 from the low range mode of operation to the normal mode of operation (S30). In one embodiment, the control logic may reattempt the shift (S30) up to five times before abandoning the shift and moving the PTU shift fork 33 moved back to its original position (low range) (S41). In one embodiment, the shift attempt (S30) may be attempted more or less times than 5. In one embodiment, the shift attempt (S30) may be attempted until a predetermined amount of time has elapsed.

In the event no PTU torque lock is detected (S40), the control logic checks for PTU tooth block (S50). PTU tooth block is a condition in which the splines of the PTU selector sleeve spline set 32 are misaligned with the PTU splines 23 and prevent engagement of the normal mode of operation of the PTU 3. With tooth block, a spring within the PTU 3 may be used to convert the movement of the PTU shift fork 33 into potential energy that engages the splines of the PTU selector sleeve spline set 32 with the PTU splines 23 as soon as the PTU input shaft 21 and PTU main shaft 30 are slightly rotated with respect to each other. In the event PTU tooth block is detected, the PTU shift fork 33 is moved into position to engage the normal operating mode of the PTU 3 (S51). Subsequently, engine 1 torque output is limited to a predetermined amount sufficient to avoid damage to the PTU 3 (S52). The position of the PTU shift fork 33 is continuously monitored (S53) and the engine 1 torque output is limited (S52) until the PTU tooth block condition is eliminated. In one embodiment, engine 1 torque output is limited in step S52. In one embodiment, the predetermined amount of torque is related to the degree of engagement between the PTU selector sleeve spline set 32 and the PTU spline sets 22, 23, 24. In one embodiment, 0% torque is transmitted if the RDM selector sleeve spline set 32 is 0% engaged with one of the PTU spline sets 22, 23, 24 and 100% torque is transmitted if the PTU selector sleeve spline set 32 is 100% engaged with one of the PTU spline sets 22, 23, 24. In one embodiment, the relationship between % transmitted torque and % engagement is linear. In one embodiment, the relationship between % transmitted torque and % engagement is non-linear.

Once the tooth block condition is eliminated and the PTU shift fork 33 fully engages the desired normal mode of operation (S53), the method initiates a shift in the RDM 4 from the low range mode of operation to the normal mode of operation (S60). Alternatively, the method directly initiates a shift in the RDM 4 from the low range mode of operation to the to the normal mode of operation (S60) if tooth block was never detected (S50). Control logic within the multi-mode drive system monitors the precise position of the RDM shift fork 63 during the shift process. The control logic monitors for RDM torque lock (S70). In the event the control logic detects RDM torque lock, the RDM shift fork 63 is moved into position to engage the normal operating mode of the RDM 4 (S71). Subsequently, torque output is limited to a predetermined amount sufficient to avoid damage to the RDM 4 (S72). In one embodiment, engine 1 torque output is limited in step S72. In one embodiment, the torque transmitted through clutch 15 is limited step S72. In one embodiment, the predetermined amount of torque is related to the degree of engagement between the RDM selector sleeve spline set 62 and the RDM spline sets 52, 53, 54. In one embodiment, 0% torque is transmitted if the RDM selector sleeve spline set 62 is 0% engaged with one of the RDM spline sets 52, 53, 54 and 100% torque is transmitted if the RDM selector sleeve spline set 62 is 100% engaged with one of the RDM spline sets 52, 53, 54. In one embodiment, the relationship between % transmitted torque and % engagement is linear. In one embodiment, the relationship between % transmitted torque and % engagement is linear. The position of the RDM shift fork 63 is continuously monitored (S73) and the engine 1 torque output is limited (S72) until the RDM torque lock condition is eliminated and the RDM shift fork 63 reaches its target position (S73). Once the RDM shift fork reaches its target position, the clutch 15 is applied (S74) and the shift is successfully completed (S103).

In the event no RDM torque lock is detected, the control logic checks for RDM tooth block (S80). With tooth block, a spring within the RDM 4 may be used to convert the movement of the RDM shift fork 63 into potential energy that engages the splines of the RDM selector sleeve spline set 62 with the RDM splines 53 as soon as the RDM input shaft 51 and RDM main shaft 60 are slightly rotated with respect to each other. In the event RDM tooth block exists, the RDM shift fork 63 is moved into position to engage the normal operating mode of the RDM 4 (S81). Subsequently, engine 1 torque output is limited to a predetermined amount sufficient to avoid damage to the RDM 4 (S82). In one embodiment, engine 1 torque output is limited in step S82 in a similar manner as in step S72. In one embodiment, engine 1 torque output is limited in step S82. In one embodiment, the torque transmitted through clutch 15 is limited step S82. The position of the RDM shift fork 63 is continuously monitored (S83) and the engine 1 torque output is limited (S82) until the RDM tooth block condition is eliminated and the RDM shift fork 63 reaches its target position (S83). Once the RDM shift fork reaches its target position, the clutch 15 is closed (S84) and the shift is successfully completed (S104). In the event no RDM tooth block is detected, the clutch 15 is applied (S90) and the shift is successfully completed (S102).

A similar process is repeated to shift the multi-mode drive system from a normal mode of operation to a low range mode of operation. However, instead of the PTU shift fork 33 moving the splines of the PTU selector sleeve spline set 32 into contact with the PTU splines 23, the splines of the PTU selector sleeve spline set 32 are moved into contact with the PTU splines 24. Likewise, the RDM shift fork 63 moves the splines of the RDM selector sleeve spline set 62 into contact with the RDM splines 54 instead of into contact with the RDM splines 53.

To shift from a low range mode of operation or a normal mode of operation into neutral operation, the PTU shift fork 33 moves the splines of the PTU selector sleeve spline set 32 into the gap between the PTU splines 23 and the PTU splines 24. Likewise, the RDM shift fork 63 moves the splines of the RDM selector sleeve spline set 62 into the gap between the RDM splines 54 and the RDM splines 53. Thus, PTU selector sleeve spline set 32 and RDM selector sleeve spline set 62 are in contact with none of the PTU splines 23, 24 or RDM splines 53, 54. In one embodiment, the method of operating the multi-mode transmission may omit the steps of checking for PTU tooth block (S50) and RDM tooth block (S80) when shifting into neutral operation.

To shift from neutral operation to a low range mode of operation or a normal mode of operation, the method performs the appropriate steps as described above. However, in one embodiment, the method of operating the multi-mode transmission may omit the steps of checking for PTU torque lock (S40) and RDM torque lock (S70) when shifting from neutral operation to a low range mode of operation or a normal mode of operation.

In one embodiment, any configuration of engine 1 and transmission 2 may be used. In one embodiment, any type or configuration of PTU 3 and RDM 4 may be used provided each has at least two corresponding modes of operation. In one embodiment, the transmission 2 may be an automatic transmission or a manual transmission. In one embodiment, the clutch 15 may be any type of clutch including, but not limited to, a wet clutch or a dry clutch. In one embodiment, the clutch 15 may be located at any position between the PTU 3 and RDM 4 or within one of, or both of, the PTU 3 or RDM 4 such the clutch 15 is capable of interrupting torque transmission between the PTU selector sleeve 31 and RDM selector sleeve 61. It should be appreciated that the present disclosure is not limited to the particular mechanical configuration described herein.

Thus, a method of operating a multi-mode drive system that precisely orchestrates the shift between gear ratios in the power take off unit and rear drive module is provided. The method precisely times the shift to improve longevity of the power take off unit and rear drive module and to increase passenger comfort.

What is claimed is:

1. A method of shifting a multi-mode drive unit comprising a transmission, a power take off unit having a first plurality of gear ratios and coupled to said transmission, and a rear drive module having a second plurality of gear ratios and coupled to said power take off unit, wherein said method in response to a shift request comprises:
    initiating a shift in said power take off unit from operation in a first gear ratio of said first plurality of gear ratios to operation in a second gear ratio of said first plurality of gear ratios;
    monitoring the progress of said shift of said power take off unit;
    rejecting said shift request if said power take off unit is unable to successfully shift from operation in said first gear ratio of said first plurality of gear ratios to operation in said second gear ratio of said first plurality of gear ratios; and
    shifting said rear drive module from operation in a first gear ratio of said second plurality of gear ratios to operation in a second gear ratio of said second plurality of gear ratios if said shift of said power take off unit is successfully completed.

2. The method of shifting a multi-mode drive unit of claim 1, wherein said second plurality of gear ratios corresponds to said first plurality of gear ratios and corresponding gear ratios from said first plurality of gear ratios and said second plurality of gear ratios are engaged simultaneously.

3. The method of shifting a multi-mode drive unit of claim 1, further comprising determining whether at least one interlock condition is satisfied prior to initiating said shift of said power take off unit and rejecting said shift request if said at least one interlock condition is not satisfied.

4. The method of shifting a multi-mode drive unit of claim 3, wherein said at least one interlock condition is selected from the group comprising anti-lock brake system status, traction control system status, electronic stability control program status, vehicle ignition status, vehicle speed, transmission status, vehicle brake application, and engine RPM.

5. The method of shifting a multi-mode drive unit of claim 1, further comprising detecting the presence of torque lock within said power take off unit after said shift is initiated in said power take off unit and rejecting said shift request if torque lock is detected.

6. The method of shifting a multi-mode drive unit of claim 1, further comprising:
    detecting the presence of tooth block within said power take off unit after said shift is initiated in said power take off unit;
    limiting torque applied to said power take off unit until said shift of said power take off unit is completed if torque lock is detected; and
    completing said shift of said power take off unit if tooth block is not detected.

7. The method of shifting a multi-mode drive unit of claim 1, further comprising:
- detecting the presence of torque lock within said rear drive module after said shift is initiated in said rear drive module; and
- limiting torque applied to said rear drive module until said shift of said rear drive module is completed if torque lock is detected.

8. The method of shifting a multi-mode drive unit of claim 1, further comprising:
- detecting the presence of tooth block within said rear drive module after said shift is initiated in said rear drive module;
- limiting torque applied to said rear drive module until said shift of said rear drive module is completed if tooth block is detected; and
- completing said shift of said rear drive module if tooth block is not detected.

9. The method of shifting a multi-mode drive unit of claim 1, wherein said drive unit further comprises a clutch selectively coupling said power take off unit to said rear drive module, and said method further comprises deactivating said clutch prior to initiating said shift in said power take off unit.

10. The method of shifting a multi-mode drive unit of claim 9, wherein said clutch is activated after said shift of said rear drive module is completed.

11. A method of operating a multi-mode drive unit comprising a transmission, a power take off unit having a first plurality of gear ratios and coupled to said transmission, and a rear drive module having a second plurality of gear ratios and coupled to said power take off unit, said first plurality of gear ratios having gear ratio ratios corresponding to said second plurality of gear ratios, comprising:
- receiving a shift request;
- determining whether at least one interlock condition is satisfied;
- rejecting said shift request if said at least one interlock condition is not satisfied;
- initiating a shift in said power take off unit from operation in a first gear ratio of said first plurality of gear ratios to operation in a second gear ratio of said first plurality of gear ratios if said at least one interlock condition is satisfied;
- monitoring the progress of said shift of said power take off unit;
- rejecting said shift request if said power take off unit is unable to successfully shift from operation in said first gear ratio of said first plurality of gear ratios to operation in said second gear ratio of said first plurality of gear ratios; and
- shifting said rear drive module from operation in a first gear ratio of said second plurality of gear ratios corresponding to said first gear ratio of said first plurality of gear ratios to operation in a second gear ratio of said second plurality of gear ratios corresponding to said second gear ratio of said first plurality of gear ratios if said shift of said power take off unit is successfully completed.

12. The method of operating a multi-mode drive unit of claim 11, wherein said at least one interlock condition is selected from the group comprising anti-lock brake system status, traction control system status, electronic stability control program status, vehicle ignition status, vehicle speed, transmission status, vehicle brake application, and engine RPM.

13. The method of operating a multi-mode drive unit of claim 11, further comprising:
- detecting the presence of torque lock within said power take off unit after said shift is initiated in said power take off unit and rejecting said shift request if torque lock is detected;
- if torque block is not detected, detecting the presence of tooth block within said power take off unit;
- limiting torque applied to said power take off unit until said shift of said power take off unit is completed if tooth block is detected; and
- completing said shift of said power take off unit if tooth block is not detected.

14. The method of operating a multi-mode drive unit of claim 13, further comprising:
- detecting the presence of torque lock within said rear drive module after said shift is initiated in said rear drive module; and
- limiting torque applied to said rear drive module until said shift of said rear drive module is completed if torque lock is detected.

15. The method of operating a multi-mode drive unit of claim 14, further comprising:
- if torque lock is not detected, detecting the presence of tooth block within said rear drive module;
- limiting torque applied to said rear drive module until said shift of said rear drive module is completed if tooth block is detected; and
- completing said shift of said rear drive unit if tooth block is not detected.

16. The method of operating a multi-mode drive unit of claim 11, wherein said drive unit further comprises a clutch selectively coupling said power take off unit to said rear drive module, and said method further comprises:
- deactivating said clutch prior to initiating said shift in said power take off unit; and
- activating said clutch after said shift of said rear drive module is completed.

17. The method of operating a multi-mode drive unit of claim 16, further comprising:
- detecting the presence of torque lock within said power take off unit after said shift is initiated in said power take off unit;
- initiating said shift in said power take off unit at least a second time if torque lock is detected within said power take off unit and rejecting said shift request if torque lock is detected after said at least second initiated shift in said power take off unit;
- if torque lock is not detected, detecting the presence of tooth block within said power take off unit;
- limiting torque applied to said power take off unit until said shift of said power take off unit is completed if tooth block is detected; and
- completing said shift of said power take off unit if tooth block is not detected.

18. The method of operating a multi-mode drive unit of claim 17, further comprising:
- detecting the presence of torque lock within said rear drive module after said shift is initiated in said rear drive module; and
- limiting torque applied to said rear drive module until said shift of said rear drive module is completed if torque lock is detected.

19. The method of operating a multi-mode drive unit of claim 18, further comprising:
- if torque lock is not detected, detecting the presence of tooth block within said rear drive module;

limiting torque applied to said rear drive module until said shift of said rear drive module is completed if tooth block is detected; and completing said shift if tooth block is not detected.

20. The method of operating a multi-mode drive unit of claim 19, wherein said shift request is rejected unless all interlock conditions are satisfied.

* * * * *